United States Patent
Pulver

[15] 3,669,247
[45] June 13, 1972

[54] CONVEYOR SYSTEM AND ATTACHMENTS THEREFOR

[72] Inventor: Willis Clark Pulver, Oak Lawn, Ill.

[73] Assignee: Velten & Pulver, Inc., Chicago Ridge, Ill.

[22] Filed: March 17, 1971

[21] Appl. No.: 125,360

Related U.S. Application Data

[63] Continuation of Ser. No. 787,075, Dec. 26, 1968, abandoned.

[52] U.S. Cl..............................198/189, 198/195, 198/197
[51] Int. Cl......................................B65g 17/00, B65g 15/30
[58] Field of Search..................198/195, 189, 197, 137, 162

[56] References Cited

UNITED STATES PATENTS

| | | | |
|---|---|---|---|
| 2,443,947 | 6/1948 | Brooks et al. | 198/189 |
| 2,954,113 | 9/1960 | Hibbard et al. | 198/189 |
| 3,386,565 | 6/1968 | Carter | 198/162 |
| 3,442,368 | 5/1969 | Heifetz | 198/197 |

Primary Examiner—Richard E. Aegerter
Attorney—Prangley, Clayton, Mullin, Dithmar & Vogel

[57] ABSTRACT

There is disclosed a conveyor system and various forms of attachments therefor for carrying foods and the like including an articulated roller chain conveyor having a support reach and a return reach, support means for the conveyor along the support and return reaches thereof, and a plurality of attachments engagable with the roller chain conveyor and comprising a one-piece body or synthetic organic plastic resin and including a base and a pair of legs depending therefrom and a pair of support flanges extending respectively outwardly from the legs and away from each other, the base having a support surface extending in use laterally of the associated roller chain for supporting foods and the like thereon along the support reach of the conveyor, the legs thereof being engagable with the roller chain conveyor and the support flanges supporting the conveyor along the return reach thereof whereby the support surfaces are maintained out of contact with any adjacent structure along the entire path of the conveyor so as to maintain the support surfaces free of contamination.

15 Claims, 10 Drawing Figures

INVENTOR
WILLIS CLARK PULVER
BY
Prangley, Baird, Clayton,
Miller & Vogel ATTYS.

CONVEYOR SYSTEM AND ATTACHMENTS THEREFOR

This application is a continuation of Ser. No. 787,075, filed Dec. 26, 1968, and now abandoned.

This invention is directed to a conveyor system and attachments therefor for carrying foods and the like, including an articulated roller chain conveyor having a support reach and a return reach, support means for the conveyor and a plurality of attachments engagable with the roller chain conveyor and adapted to carry foods and the like along the support reach thereof.

The principal object of this invention is to provide a conveyor system having an articulated roller chain conveyor including a support reach and a return reach, the conveyor having a plurality of links joined together by connecting pins having the outer ends thereof protruding laterally beyond the links, support means for the conveyor including a pair of laterally spaced-apart upper guide rails disposed adjacent to and for supporting the support reach of the conveyor and a pair of laterally spaced-apart lower guide rails disposed adjacent to and for supporting the return reach thereof, a plurality of attachments engagable with the conveyor and each comprising a one-piece body of synthetic organic plastic resin and including a base and a pair of legs depending therefrom and a pair of support flanges extending respectively outwardly from the legs and away from each other, the base having a support surface extending in use laterally of the associated roller chain for supporting foods and the like along the support reach of the roller chain conveyor, the legs being disposed substantially normal to the base and having facing surfaces disposed substantially parallel and spaced apart a distance slightly less than the length of the associated connecting pins and having sockets therein for receiving the outer ends of the associated pins therein for mounting the attachment to the roller chain and each of the support flanges extending laterally outwardly from the associated leg adjacent to the lower end thereof for engagement with the associated lower guide rail along the return reach of the roller chain conveyor, the upper and lower guide rails contacting the support surfaces and support flanges respectively in such a manner as to maintain the support surfaces out of contact with any adjacent structure along the entire path of the conveyor so as to maintain the support surfaces free of contamination.

Another object of this invention is to provide a conveyor system having an articulated roller chain conveyor including an upper support reach, a lower support reach and an inclined support reach interconnecting the upper and lower support reaches thereof and a return reach, the conveyor having a plurality of links joined together by connecting pins having the outer ends thereof protruding laterally beyond the links, support means for the conveyor including at least a pair of laterally spaced-apart upper guide rails disposed adjacent to and for supporting the upper reaches of the conveyor, and a plurality of attachments engagable with the roller chain conveyor each comprising a one-piece body of synthetic organic plastic resin having a base and a pair of legs depending therefrom, the base having a support surface extending in use laterally of the associated roller chain and including an upstanding abutment of the support surface for supporting foods and the like thereagainst along the inclined support reach of the conveyor, and the legs thereof being disposed substantially normal to the base and having facing surfaces disposed substantially parallel and spaced apart a distance slightly less than the length of the associated connecting pins and further having sockets therein adjacent to the lower end thereof and positioned to receive the outer ends of the associated pins therein for mounting the attachment to the roller chain, the upper guide rails contacting the base at points spaced from the support surface to guide the conveyor and the attachments thereon along the upper reaches of the conveyor without contact with the support surfaces such that the support surfaces are maintained out of contact with any adjacent structure along the upper reaches thereof so as to maintain the support surfaces free of contamination.

In connection with the foregoing object, it is another object of this invention to provide a conveyor system of the type set forth which further includes a pair of laterally spaced-apart lower guide rails disposed adjacent to and for supporting the return reach of the conveyor and wherein the legs depending from the base further include a pair of support flanges extending respectively outwardly from the legs and away from each other adjacent to the lower end thereof for engagement with the associated lower guide rail along the return reach of the roller chain conveyor to guide the conveyor and the attachments thereon along the return reach of the conveyor without contact with the support surfaces such that the support surfaces are maintained out of contact with any adjacent structure along the entire pat of the conveyor and remain free of contamination.

Still another object of this invention is to provide an attachment for carrying foods and the like on the support reach of and for supporting upon an associated guide rail along the return reach of an articulated roller chain conveyor which includes links with connecting pins having the outer ends thereof protuding laterally beyond the links, the attachment including an integral one-piece body of synthetic organic plastic resin having a base and a pair of legs depending therefrom and a pair of support flanges extending respectively outwardly therefrom and away from each other, the base having a support surface extending in use laterally of the associated roller chain for supporting foods and the like thereon along the support reach of the conveyor, the legs thereof being disposed substantially normal to the base and having facing surfaces disposed substantially parallel and spaced apart a distance slightly less than the length of the associated connecting pins and further having sockets therein adjacent to the lower end thereof and positioned to receive the outer ends of the pins therein for mounting the attachment to the associated roller chain, and the support flanges extending laterally outwardly from the associated leg adjacent to the lower end thereof for engagement with the associated guide rails along the return reach of the conveyor whereby the support surfaces are maintained out of contact with any adjacent structures and objects except the food articles to be supported thereon along the support and return reaches of the conveyor.

A further object of this invention is to provide an attachment of the type set forth used in connection with a conveyor having a support reach including portions movable along a rectilinear path wherein the forward edge of the base includes swept-back ends to facilitate movement of the conveyor laterally with respect to the rectilinear path of the support reach thereof.

In connection with the foregoing object, it is yet another object of this invention to provide an attachment of the type set forth wherein the forward and trailing edges of the base are beveled along the length thereof to facilitate movement of adjacent attachments along those portions of the conveyance course where the bases thereof are disposed in a concave configuration.

Yet another object of this invention is to provide an attachment of the type set forth wherein the facing surfaces of the legs are essentially planar and each of the facing surfaces is continuous with the adjacent surfaces of the associated support flanges disposed away from the body, the juncture of said surfaces being arcuate along the length thereof thereby presenting smooth guides for facilitating the engagement of the associated pin within the socket when mounting the attachment on the roller chain conveyor.

Another object of this invention is to provide an attachment of the type set forth which includes side guides extending upwardly from the opposing lateral ends of the base and extending between the forward and trailing edges thereof.

It is yet another object of this invention to provide an attachment of the type set forth wherein the base includes an upper surface extending in use laterally of the associated roller chain having support members of limited area extending from the upper surface thereof for supporting foods and the like spaced from the upper surface, the spaces between the underside of the supported object and the upper surface accommodating the passage of a cooling fluid therethrough to cool the objects supported thereon during the transportation thereof along the support reach of the roller chain conveyor.

A further object of this invention is to provide an attachment of the type set forth wherein the base includes an upstanding abutment structure on the support surface for supporting foods and the like thereagainst along the inclined reach of the conveyor.

Further features of the invention pertain to the particular arrangement of the structures and parts whereby the above-outlined and additional operating features thereof are attained.

The invention, both as to its organization and method of operation, together with further objects and advantages thereof, will best be understood by reference to the following specification taken in connection with the accompanying drawings in which.

Figure 1:
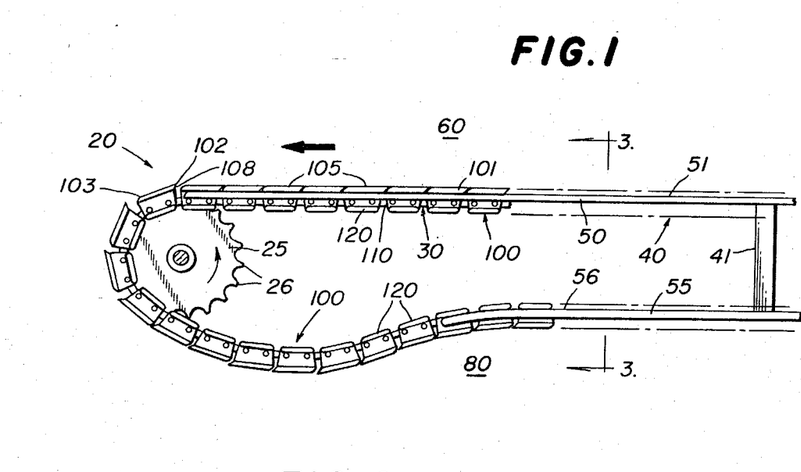
FIG. 1 is a side elevational view of a portion of the conveyor system including the conveyor, the attachments thereon and the drive means for the conveyor, which conveyor system embodies the principles of the present invention.

Referring now to FIG. 1 of the drawings, there is shown a conveyor system generally indicated at 20 including a sprocket 25 and a support frame 40 for supporting an articulated roller chain conveyor 30 which in turn, includes a plurality of attachments generally indicated at 100 engagable with the conveyor 30 and adapted for carrying foods and the like thereon along a portion of the conveyance course.

Figure 3:
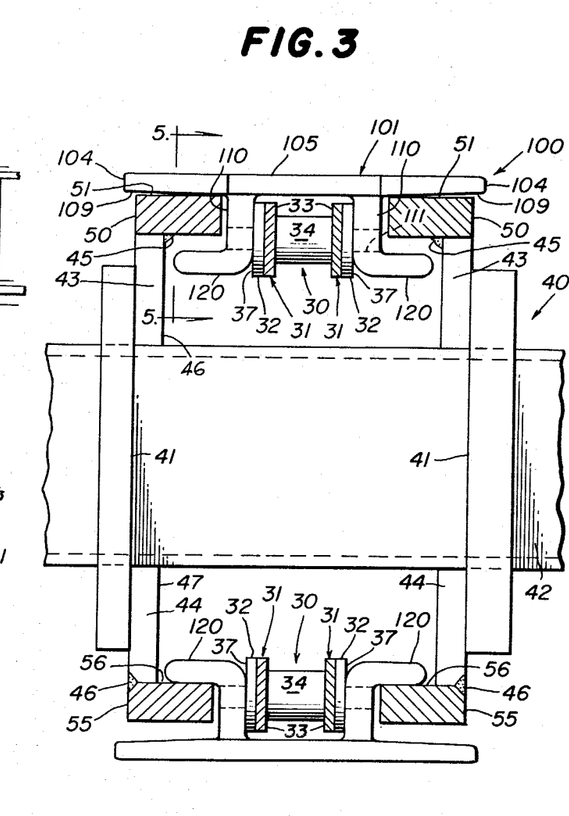
FIG. 3 is a cross-sectional view of the conveyor system illustrating the relationship between the support frame, the roller chain and the attachments carried thereon, which view is taken in the direction of the arrows along the line 3—3 in FIG. 1.
Figure 4:
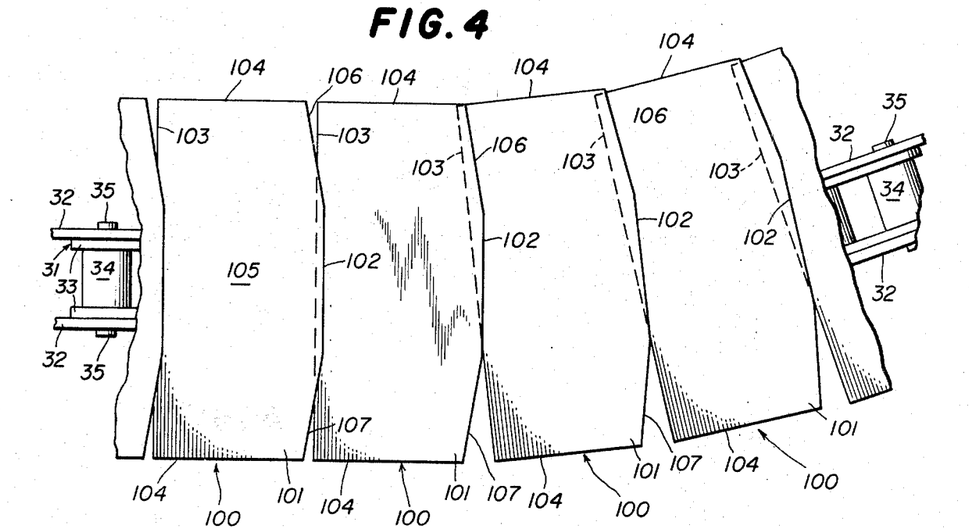
FIG. 4 is a top plan view of a section of the conveyor showing the roller chain and the attachments mounted thereon adapted for movement laterally with respect to the rectilinear path of the conveyor.
Figure 5:
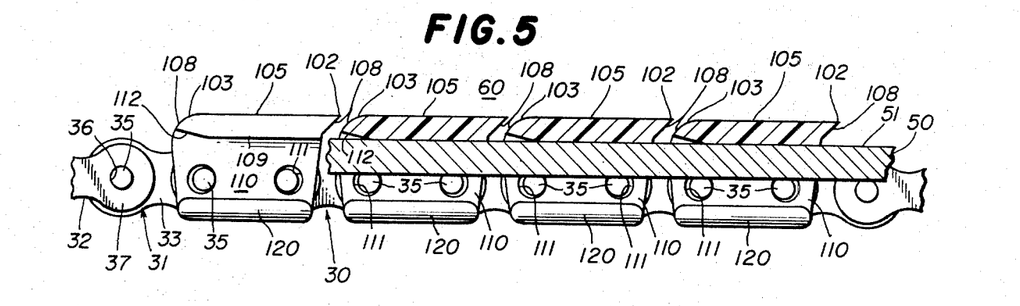
FIG. 5 is a side elevational, partly cross-sectional view of the roller chain conveyor and the attachments thereon taken along the line 5—5 in FIG. 3.

The conveyor 30 is supported at least in part by the sprocket 25 rotatably mounted in the usual manner and driven in the direction of the arrow thereon in FIG. 1, the sprocket 25 carrying teeth 26 around the periphery thereof. As illustrated in FIGS. 3 and 4 of the drawings, the conveyor 30 consists of a conventional type of roller chain conveyor including articulated links in the form of interconnected alternately arranged roller links 31 and pin links 32 shown in FIGS. 3 and 4 of the drawings. Each roller link 31 is comprised of a pair of plates 33 which are held in parallel spaced relationship by a pair of transversely disposed sleeves (not shown), the ends of which are pressed into holes (not shown) formed in the plates 33 near the respective ends thereof to form a substantially rectangular configuration. Each sleeve carries a roller 34 which is rotatably mounted thereon and fitted between the respective plates 33 in such a manner as to be freely rotatable on the sleeves, the rollers 34 of each roller link 31 being spaced for rolling engagement with the cooperating teeth 26 of the sprocket 25.

The successive roller links 31 of the roller chain conveyor 30 are interconnected by pin links 32 held in parallel spaced relationship by a pair of pins 35 the ends of which are placed into and through holes 36 in the pin links 32 near the respective ends thereof. Each of the pairs of pin links 32 is attached to adjacent roller links 31 and the pins 35 pass through and are journalled in the hollow sleeves of adjacent roller links 31 in a manner to effect pivotal connections therebetween permitting articulation of the links of the chain. The pins 35 protrude laterally for a short distance beyond the outer surfaces 37 of the pin links 32 to accommodate the engagement of the attachments 100 thereon.

As illustrated in FIG. 1, the sprocket 25 and other support structures not illustrated support and maintain the articulated roller chain conveyor 30 to provide a support reach 60 along which foods and the like are supported, and a return reach 80 along which the attachments 100 return for further use in supporting articles along the conveyance course.

The support frame 40 is illustrated in FIG. 1, and in greater detail in FIG. 3 of the drawings, and is shown to include a plurality of vertical support bars 41 which are spaced apart and adapted to support guide rails thereon upon which the roller chain conveyor 30 is in turn supported. The support bars 41 may be mounted on or carried by a table 42, or alternatively, the support bars 41 may be supported by the ground or suspended from any suitable structure, the particular manner of constructing the support frame 40 being primarily dependent upon the overall system in which the conveyor system is to be employed. The support bars 41 respectively support upper mounting walls 43 fixedly secured to the respective upper end portions of the support bars 41, the support bars 41 also respectively support lower mounting walls 44 secured to the lower end portions of the support bars 22, the terms upper and lower being used with reference to the support frame 40 as viewed in FIG. 3 of the drawings. The upper mounting walls 43 respectively carry upper guide rails 50 suitably secured thereto such as by weldments 45 and the lower mounting walls 44 respectively carry lower guide rails 55 similarly secured thereto by any suitable means such as weldments 46. The upper and lower guide rails 50 and 55 are each respectively spaced apart a predetermined distance in order to accommodate the conveyor 30 and the attachments 100 mounted thereon between the respective guide rails.

The upper guide rails 50 include exterior surfaces 51 which slidably support the attachments 100 thereon along the support reach 60 of the conveyor 30 and the lower guide rails 55 include interior surfaces 56 which also slidably support the attachments 100 along the return reach 80 of the conveyor 30. The upper mounting walls 43 and lower mounting walls 44 include inner surfaces 46 and 47 respectively which are spaced apart a predetermined distance and which cooperate with the upper and lower guide rails 50 and 55 respectively to form a track for accommodating the conveyor 30 with the attachments 100 mounted thereon to be slidably supported thereon and movably accommodated therebetween, as will be more fully described hereinafter.

The nature and construction of one form of novel attachment 100 embodying this invention is more clearly shown in FIGS. 3 through 7 of the drawings. In particular reference to FIG. 6, the attachment 100 generally comprises a base 101 having a generally rectangular configuration and including a forward edge 102, a trailing edge 103 and side edges 104. The base 101 includes a support surface 105 having a lower surface 109 and extending in use laterally of the associated roller chain conveyor 30 as illustrated in FIG. 4, the lower surface 109 having a slight cut back portion as indicated at 112 in FIG. 5 extending along the length of the trailing edge 103. The forward edge 102 has end portions 106 and 107 swept-back slightly and the forward edge 102 and trailing edge 103 are both beveled as indicated at 108. A pair of legs 110 depends from the base 101 substantially normal thereto and having the facing surfaces 115 thereof disposed substantially parallel with respect to one another and spaced apart a distance slightly less than the length of the associated connecting pin 35. Each leg 110 is provided with two sockets 111 disposed adjacent to the lower end thereof and positioned a predetermined distance from the support surface 105 of the base 101, the sockets 111 having a diameter slightly greater than the diameter of the associated pin 35. Each of the legs 110 is further provided with a support flange 120 extending laterally outwardly for a predetermined distance therefrom adjacent to the lower end thereof and having an outer surface 121 disposed adjacent to and having a juncture 125 with the facing surface 115 of the associated leg 110, and an inner surface 126 spaced from and disposed essentially parallel to the outer surface 121 thereof.

Figure 8:
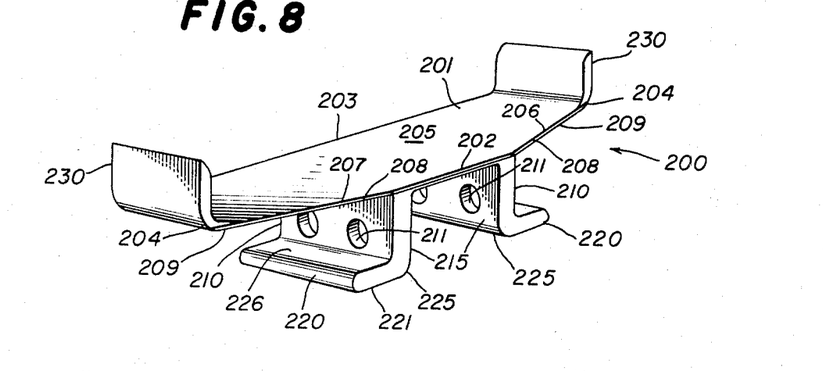
FIG. 8 is a perspective view of another species of an attachment embodying the principles of the present invention.

FIG. 8 of the drawings illustrates another form of novel attachment 200 which also embodies the principles of this invention. The attachment 200 is constructed substantially similar to the attachment 100 illustrated in FIG. 6 and generally comprises a base 201 having a generally rectangular configuration and including a forward edge 202, a trailing edge 203 and side edges 204. The base 201 includes a support surface 205 having a lower surface 209 and extending in use laterally of the associated roller chain conveyor 30 as was described with reference to the attachment 100. Similarly, the forward edge 202 has end portions 206 and 207 swept-back slightly and the forward edge 202 and trailing edge 203 are both beveled as indicated at 208. The attachment 200 further includes a pair of legs 210 depending from the base 201 and being substantially normal thereto and having the facing surfaces 215 thereof disposed substantially parallel with respect to one another and spaced apart a distance slightly less than the length of the associated connecting pin 35 of the conveyor 30. Each leg 210 is similarly provided with two sockets 211 disposed adjacent to the lower end thereof and positioned a predetermined distance from the support surface 205 of the base 201, the sockets 211 having a diameter slightly greater than the diameter of the associated pin 35. Each of the legs 210 also includes a support flange 220 extending laterally outwardly for a predetermined distance therefrom adjacent to the lower end thereof and having an outer surface 221 disposed adjacent to and having a juncture 225 with the facing surface 215 of the associated leg 210, and an inner surface 226 spaced from and disposed essentially parallel to the outer surface 221 thereof. The attachment 200 further includes side guides 230 extending upwardly from the opposing side edges 204 of the base 201, and being substantially normal with respect to the base 201. As illustrated in FIG. 8, the side guides 230 are in the form of upturned ends of the side edges 204, however, it will be understood that the side guides 230 may consist of any type of upstanding structure disposed adjacent to the side edges 204. For example, one or more finger members extending upwardly from the side edges 204 in normal or obtuse relationship therewith may be provided as side guides. The side guides 230 are provided in order to prevent objects which are carried on the support surface 205 from sliding off of the conveyor 30 as it moves along the support reach 60 thereof. It will therefore be appreciated that the particular configuration of the side guides 230 is not deemed to be a critical feature of this invention.

Figure 6:
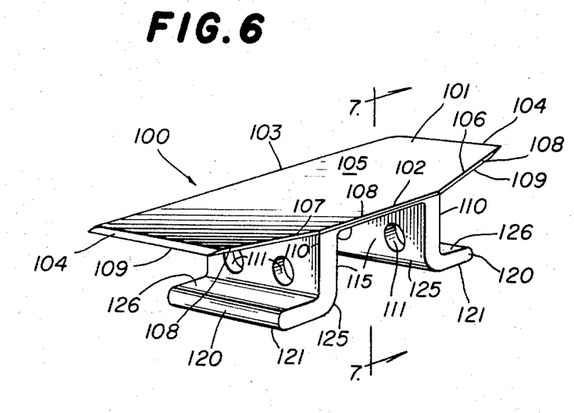
FIG. 6 is a perspective view of one species of the attachment adapted for engagement with a roller chain conveyor and embodying the principles of the present invention.
Figure 7:
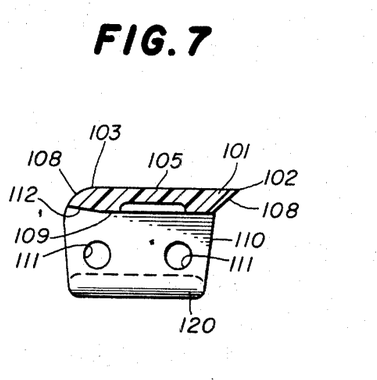
FIG. 7 is a side cross-sectional view of the attachment body taken in the direction of the arrows along the line 7—7 in FIG. 6.
Figure 9:
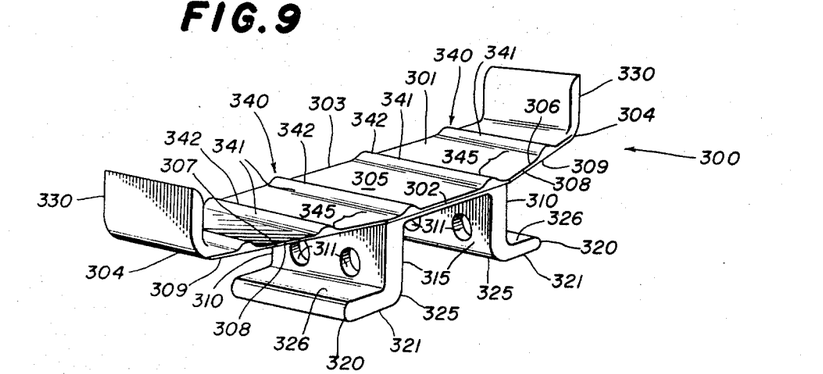
FIG. 9 is a perspective view of still another species of an attachment embodying the principles of the present invention.

Still another form of novel attachment 300 is illustrated in FIG. 9 of the drawings which is also substantially similar in construction to the attachments 100 and 200 illustrated in FIGS. 6 and 8 as described previously. The attachment 300 generally comprises a base 301 having a generally rectangular configuration and includes a forward edge 302, and a trailing edge 303 and side edges 304 and the base 301 includes a support surface 305, having a lower surface 309 and extending in use laterally of the associated roller chain conveyor 30. The forward edge 302 similarly has end portions 306 and 307 respectively which are swept-back slightly and the forward edge 302 and trailing edge 303 are both beveled as indicated at 308. A pair of legs 310 depends from the base 301 substantially normal thereto and having the facing surfaces 315 thereof disposed substantially parallel with respect to one another and spaced apart a distance slightly less than the length of the associated connecting pin 35. Similarly, each leg 310 is provided with two sockets 311 disposed adjacent to the lower end thereof and positioned a predetermined distance from the support surface 305 and the base 301. The sockets 311 have a diameter slightly greater than the diameter of the associated pin 35. Each of the legs 310 is further provided with a support flange 320 extending laterally outwardly for a predetermined distance therefrom adjacent to the lower end thereof and having an outer surface 321 disposed adjacent to and having a juncture 325 with the facing surface 315 of the associated leg 310, and an inner surface 326 spaced from and disposed essentially parallel to the outer surface 321 thereof.

The attachment 300 also includes a pair of side guides 330 extending upwardly from the base 301 and being substantially normal thereto and being in the form of upturned ends of the side edges 304 as described with respect to the side guides 230 in FIG. 8 of the drawings. The base 301 further includes a plurality of support members 340 extending across the support surface 305 thereof from the forward edge 302 to the trailing edge 303. The support members 340 are in the form of ridges 341 having peaks 342 which together cooperate to provide a support surface spaced above the main support surface 305 such that objects placed thereon are supported at an elevated position with respect to the main support surface 305. The spaces 345 between respectively adjacent ridges 341 provide convenient passageways for cooling fluid such as air and the like whereby heated articles which are supported upon the peaks 342 of the ridges 341 may be rapidly cooled as a result of the circulation of cooling fluids around and under the object supported thereon.

Figure 10:
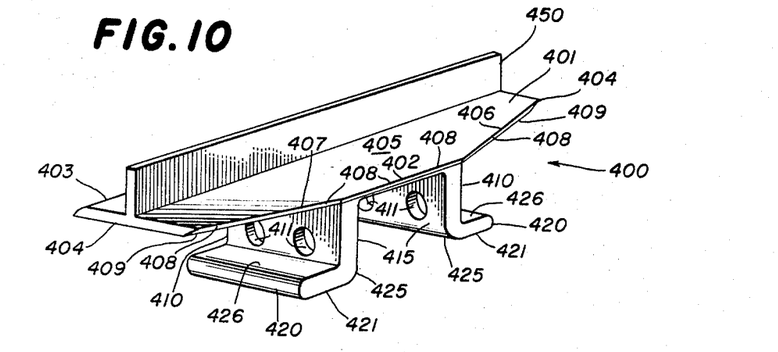
FIG. 10 is a perspective view of yet another species of an attachment embodying the principles of the present invention.

A fourth form of novel attachment 400 similarly embodying the principles of the present invention is illustrated in FIG. 10 of the drawings. The attachment 400 comprises a base 401 having a generally rectangular configuration and including a forward edge 402, a trailing edge 403 and side edges 404, the base 401 including a support surface 405 having a lower surface 409 and extending in use laterally of the associated roller chain conveyor 30. The forward edge 402 similarly has end portions 406 and 407 respectively which are swept-back slightly and the forward edge 402 and trailing edge 403 are also beveled as indicated at 408. A pair of legs 410 depends from the base 401 substantially normal thereto and having facing surfaces 415 disposed substantially parallel with respect to one another and spaced apart a distance slightly less than the length of the associated connecting pin 35. Again, each leg 410 is provided with two sockets 411 disposed adjacent to the lower end thereof and positioned a predetermined distance from the support surface 405 of the base 401, the sockets 411 having a diameter slightly greater than the diameter of the associated pin 35. Each of the legs 410 also includes a support flange 420 extending laterally outwardly for a predetermined distance therefrom adjacent to the lower end thereof and having an outer surface 421 disposed adjacent to and having a juncture 425 with the facing surface 415 of the associated leg 410, and an inner surface 426 spaced from and disposed essentially parallel to the outer surface 421 thereof.

The base 401 further includes an upstanding abutment structure 450 mounted thereon and extending laterally between the opposed side edges 404 thereof. The upstanding abutment structure 450, as shown in FIG. 10, is in the form of a parapet or wall member mounted on the base 401. This structure provides a convenient surface against which objects disposed on the conveyor 30 may rest as the objects are transported along the support reach 60 of the conveyor 40. More specifically, the attachment 400 including the upstanding abutment structure 450 is utilized in a conveyor system such as that illustrated in FIG. 2 of the drawings as will be more fully described hereinafter. It is to be understood, of course, that the upstanding abutment structure 450 may be formed of any suitable structure or structures which have sufficient dimensions and strength for supporting objects thereagainst. For example, the upstanding abutment structure 450 may consist of one or more finger members extending upwardly from the support surface 405 and spaced apart in horizontal alignment thereon. Similarly other types of structures may be employed in this connection for supporting objects thereagainst.

In describing the manner in which the various attachments of this invention are mounted on the conveyor 30, reference will be made to the attachment 100 described in connection with FIG. 6 of the drawings. It is to be understood that the other forms of the attachments, 200, 300 and 400 respectively, described previously, are mounted on the conveyor 30 in a similar manner. As was previously described, the conveyor 30 consists of roller links 31 and pin links 32 which are held in spaced relationship by a pair of sleeves having a roller 34 rotatably mounted thereon. Each roller link 31 includes two pins 35 which are passed through and journalled in the hollow sleeves of the roller links 31, the pins 35 protruding laterally for a short distance beyond the outer surface 37 of the pin links 32. One attachment 100 is provided for each roller link 31 of the conveyor 30 and is mounted thereon by having the respective legs 110 thereof disposed on opposing sides of the conveyor 30 with the protruding ends of the pins 35 disposed within the sockets 111 of the legs 110. The attachment 100 including the legs is formed of a resilient material such that the legs 110 are capable of spreading apart when force is applied thereto. In order to mount the attachment 100 on the conveyor 30, the attachment 100 is placed on the conveyor 30 with the sockets 111 thereof in vertical alignment with the protruding ends of the pins 35. The attachment 100 will not easily engage the conveyor 30 since the distance between the respective legs 110 is slightly less than the length of the associated pin 35. Therefore, it is necessary to apply a downwardly directed force to the attachment 100 whereby the pin 35 forces the legs 110 to spread apart until the sockets 111 receive the protruding ends of the pins 35 therein. The facing surfaces 115 of the legs 110 present smooth guides for facilitating the mounting procedure by enabling the pins 35 to easily slide along the surfaces thereof until they meet with and engage within the sockets 111. The resiliency of the material of which the attachment 100 is formed will cause the legs 110 once again to assume a parallel relationship with respect to each other and a normal relationship with respect to the base 101 once the pins 35 have been received in the sockets 111 thereof.

As was previously described, the upper guide rails 50 include exterior surfaces 51 which are spaced apart a distance slightly greater than the width of the conveyor 30 and the attachment 100 mounted thereon, and more specifically, a distance slightly greater than the combined widths of the roller chain conveyor 30 and the two legs 110 disposed on opposing sides thereof. Similarly, the lower guide rails 55 include interior surfaces 56 which are also spaced apart a distance slightly greater than the combined widths of the conveyor 30 and the legs 110 disposed on opposing sides thereof.

The upper guide rails 50 and the lower guide rails 55 each have a thickness, or vertical dimension, as viewed in FIG. 3, which is considerably less than the height of the associated legs 110 depending from the base 101 of the attachment 100 and the upper mounting walls 43 and lower mounting walls 44 are spaced apart a distance slightly greater than the combined widths of the support flanges 120 and the associated roller chain conveyor 30. Hence, the upper and lower guide rails 50 and 55, respectively, cooperate with the upper and lower mounting walls 43 and 44, respectively, to form a track for accommodating the roller chain conveyor 30 and the attachments 100 mounted thereon throughout the support and return reaches thereof.

The upper surfaces 51 of the upper guide rails 50 support the conveyor 30 and the attachment 100 mounted thereon by slidably engaging the lower surface 109 of the base 101. As the drive means for the conveyor, e.g., the sprocket 25 and the associated teeth 26, move the conveyor 30 along the support reach 60 thereof, the lower surfaces 109 of the attachments 100 slide along the upper surfaces 51 of the upper guide rails 50. Similarly, the interior surfaces 56 of the lower guide rails 55 contact the inner surfaces 126 of the support flanges 120 such that the support flanges 120 are in sliding engagement with the interior surfaces 56 thereof and hence support the attachment 100 and the associated conveyor 30 along the return reach 80 of the conveyor 30.

The conveyor system 20, as illustrated in FIG. 1 of the drawings, shows a conveyor 30 having a support reach 60 along which the objects are transported and a return reach 80 along which the attachments 100 are returned for further use in transporting additional objects. The support reach 60 moves in a generally rectilinear path and the attachments 100, as mounted on the conveyor 30, form a substantially continuous flat support surface 105 for supporting objects thereon. As shown in FIG. 4, the forward edge 102 of one attachment 100 rides over the trailing edge 103 of the next adjacent attachment 100, the bevel 108 of the forward edge 102 facilitating this relationship such that a substantially continuous flat support surface 105 is obtained. As the conveyor 30 is caused to move in a curved or lateral direction with respect to the rectilinear path thereof, the construction of the respectively adjacent attachments 100 permits the attachment 100 to move such that a substantially continuous flat support surface 105 is maintained along these curved portions of the support reach 60. More specifically, the trailing edge 103 of one attachment 100 is caused to ride under the swept-back end portion 106 of the forward edge 102 of the preceding adjacent attachment 100 as shown in FIG. 4 of the drawings. This movement is further facilitated by the bevel 108 of the forward and trailing edges 102 and 103 respectively of the attachments 100. Hence, the swept-back end portions 106 and 107, as well as the bevel 108 of the forward and trailing edges 102 and 103 respectively, cooperate to facilitate the lateral or curved movement of the adjacent attachments 100 throughout those portions of the support reach 60 which move laterally with respect to the normally rectilinear path thereof.

Figure 2:
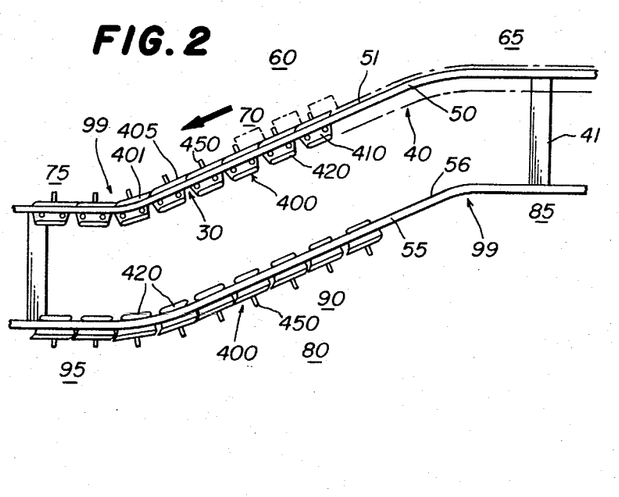
FIG. 2 is a side elevational view of a portion of another embodiment of a conveyor system including inclined portions of a conveyor and incorporating another species of the attachment mounted thereon similarly embodying the principles of the present invention.

FIG. 2 illustrates another embodiment of a conveyor system which includes a support reach 60 having an upper support reach 65, a lower support reach 75 and an inclined support reach 70 which interconnects the upper and lower support reaches 65 and 75 respectively. The return reach 80 similarly includes an upper return reach 85 and a lower return reach 95 and an inclined return reach 90 which interconnects the upper and lower return reaches 85 and 95 respectively. There is shown a conveyor 30 having a plurality of attachments 400 mounted thereon and movable throughout the support reaches and return reaches thereof. It will be observed that the attachment 400 which includes an upstanding abutment structure 450 is particularly suitable for transporting objects in a conveyor system which includes a conveyor 30 having an inclined support reach 70 along the conveyance course since the upstanding abutment structure 450 provides a convenient surface against which the objects may rest along the inclined portion 90 of the support reach thereof. In addition, it will be noted that a conveyor system having the configuration as shown in FIG. 2 includes portions thereof wherein the bases 401 of respectively adjacent attachments 100 are disposed in a concave configuration as indicated at 99 in FIG. 2. The bevel 408 of the forward and trailing edges 402 and 403 respectively adjacent attachments 400 cooperate to facilitate the movement of the attachments 400 through these portions of the conveyance course. Hence, in addition to facilitating movement in lateral directions with respect to the rectilinear path of the support reach 60, the bevels 408 of the forward and trailing edges 402 and 403 respectively, serve the important purpose of permitting the attachments 400 to move throughout those portions of the conveyance course wherein the respective bases 401 thereof assume a concave configuration.

The movement of the attachments 100 in curved or lateral directions with respect to the rectilinear path of the support reach 60, as well as movement along those portions of the support reach 60 wherein the bases 401 of respective attachments 400 are disposed in a concave configuration, is further facilitated by the construction of the sockets 111 of the legs 110, and the relationship, thereof with the pins 35. More specifically, the sockets 111 have a diameter which is greater than the diameter of the associated pin 35 such that when the attachment 100 is mounted on the conveyor 30, the pins 35 loosely fit within the respective sockets 111. This construction is clearly shown in FIG. 5 of the drawings and it will be appreciated that movement of the attachments 100 in any of the directions mentioned previously will be facilitated by the loose fit of the pins 35 within the sockets 111. This relationship between the sockets 111 and the respective pins 35 is applicable to all of the forms of attachments, 100, 200, 300 and 400 respectively, as illustrated in FIGS. 6, 8, 9 and 10.

The attachment 100, including the base 101, the legs 110 and the support flanges 120 is formed as a one-piece body of a synthetic organic plastic resin. The preferred type of resin includes those materials which have a high impact and high heat resistance such as nylon for example, and more specifically such as the nylon resin sold under the trademark ZYTEL 101. In addition to the characteristics mentioned above, the material must also be sufficiently resilient to the extent that the legs 110 of the attachment 100 must have the ability to spread apart in order to accommodate the mounting of the attachment 100 on the roller chain conveyor 30. As was previously described, the distance between the respective legs 110 of the attachment 100 is slightly less than the length of the associated pin 35 and in order to mount the attachment 100 on the conveyor 30, it is necessary that the pin 35 force the respective legs 110 apart until the protruding ends of the pin 35 engage within the respective sockets 111 of the legs 110. The resiliency of the material of which the attachment 100 is formed will cause the legs once again to assume a parallel relationship with respect to one another and to be disposed in normal relationship with respect to the base 101. The attachments may be manufactured from a suitable synthetic organic plastic resin in a standard injection molding operation on a mass production basis. Of course, any other type of procedure utilized in the plastic art may be conveniently utilized in order to manufacture the attachments 100 as set forth herein.

From the above description it will be seen that there has been provided an improved conveyor system and attachments for use upon conveyors incorporated in a conveyor system which fulfill all of the objects and advantages as set forth above. More particularly, there has been provided an improved attachment for a conveyor wherein the support surface thereof is maintained out of contact with any adjacent structures and objects except the articles to be supported thereon along both the support reach and the return reach of a roller chain conveyor so as to maintain the support surfaces free of contamination.

While there has been described what is at present considered to be the preferred embodiment of this invention, it will be understood that various modifications may be made therein, and it is intended to cover in the appended claims all such modifications as fall within the true spirit and scope of the invention.

What is claimed is:

1. A conveyor system for carrying foods and the like, comprising an articulated roller chain conveyor including an upper support reach and a lower support reach and an inclined support reach interconnecting said upper and lower support reaches, said conveyor having a plurality of links joined together by connecting pins having the outer ends thereof protruding laterally beyond said links, support means for said conveyor, said support means including a pair of laterally spaced apart upperguide rails disposed adjacent to and for supporting the upper support reach of said conveyor, a plurality of attachments engageable with said roller conveyor, each of said attachments including a base and a pair of legs depending therefrom, said base having a support surface extending in use laterally of the associated roller chain for supporting foods and the like thereon along the support reach of the roller chain conveyor, the forward and trailing edges of said base being beveled along the length thereof, the beveled trailing edge of said base including two beveled surfaces respectively extending from said support surface and the opposite surface of said base and intersecting approximately midway therebetween, said beveled trailing edge cooperating with said guide rails and with the beveled forward edge of the adjacent attachment to permit movement of said attachments between the lower and inclined support reaches of said conveyor, said legs being disposed substantially normal to said base and depending therefrom and having facing surfaces disposed essentially parallel and spaced-apart a distance slightly less than the length of the associated connecting pins, each of said legs having a socket therein adjacent to the lower end thereof and positioned a predetermined distance from said support surface, said sockets respectively receiving the outer ends of said pins therein for mounting said attachment on the associated roller chain, said upper guide rails contacting said base at points spaced from said support surface thereby to guide said conveyor and said attachments thereon along the upper support reach of said conveyor without contact with said support surfaces, whereby said attachments are freely movable between the lower and inclined support reaches of said conveyor while said support surfaces are maintained out of contact with any adjacent structure along the support reach of said conveyor so as to maintain said support surfaces free of contamination.

2. The conveyor system set forth in claim 1, and further including abutment structure on said base extending upwardly from said support surface to hold the supported foods on said support surface along said inclined support reach.

3. A conveyor system for carrying foods and the like comprising an articulated roller chain conveyor including an upper support reach and a lower support reach and an inclined support reach interconnecting said upper and lower support reaches, said conveyor having a plurality of links joined together by connecting pins having the outer ends thereof protruding laterally beyond said links, support means for said conveyor, said support means including a pair of laterally spaced-apart upper guide rails disposed adjacent to and for supporting the upper support reach of said conveyor, a plurality of attachments engageable with said roller chain conveyor and each comprising a one-piece body of synthetic organic plastic resin, each of said attachments including a base and a pair of legs depending therefrom, said base having a support surface extending in use laterally of the associated roller chain for supporting foods and the like along the support reach of said conveyor, the forward and trailing edges of said base being beveled along the length thereof, the beveled trailing edge of said base including two bevel surfaces respectively extending from said support surface and the opposite surface of said base and intersecting approximately midway therebetween, said trailing edge cooperating with the beveled forward edge of the adjacent attachment to permit movement of the adjacent attachments where the bases thereof are disposed in a concave configuration, abutment structure on said base extending upwardly from said support surface to hold the supported foods on said support surface along said inclined support reach, said legs being disposed substantially normal to said base and depending therefrom and as-molded having facing surfaces disposed substantially parallel and spaced apart a distance slightly less than the length of the associated connecting pins, each of said legs having a socket therein adjacent to the lower end thereof and positioned a predetermined distance from said support surface, said sockets respectively receiving the outer ends of the associated one of said pins therein for mounting said attachment on said roller chain, said upper guide rails contacting said base at points spaced from said support surface thereby to guide said conveyor and said attachments thereon along the upper support reach of said conveyor without contact with said support surfaces, whereby said support surfaces are maintained out of contact with any adjacent structure along the upper support reach of said conveyor so as to maintain said support surfaces free of contamination.

4. The conveyor system as set forth in claim 3, wherein the upper support reach includes portions movable along a rectilinear path and the forward edge of said base has swept-back ends, the swept-back ends and beveled edges of the bases of adjacent attachments cooperating to accommodate overlapping of the adjacent ends of said bases to permit movement of said conveyor laterally with respect to the rectilinear path of said portions of said upper support reach.

5. An attachment for carrying foods and the like on an articulated roller chain conveyor including an upper support reach and a lower support reach and an inclined support reach interconnecting the upper and lower support reaches, the conveyor having a plurality of links joined together by connecting pins having the outer ends thereof protruding laterally beyond the links, said attachment comprising a base and a pair of legs depending therefrom, said base having a support surface extending in use laterally of the associated roller chain for supporting foods and the like thereon along the support reach of the roller chain conveyor, the forward and trailing edges of said base being beveled along the length thereof, the beveled trailing edge of said base including two beveled surfaces respectively extending from said support surface and the opposite surface of said base and intersecting approximately midway therebetween, the beveled edges of said base cooperating with the conveyor and with the beveled edges of like adjacent attachments to facilitate movement thereof between the lower and inclined support reaches of the conveyor, said legs being disposed substantially normal to said base and depending therefrom and having facing surfaces disposed essentially parallel and spaced-apart a distance slightly less than the length of the associated connecting pins, each of said legs having a socket therein adjacent to the lower end thereof and positioned a predetermined distance from said support surface, said sockets respectively receiving the outer ends of said pins therein for mounting said attachment on the associated roller chain, whereby the beveled edges of the base accommodate free movement of said attachment between the lower and inclined support reaches of the conveyor.

6. The attachment set forth in claim 5, and further including abutment structure on said base extending upwardly from said support surface to hold the supported foods on said support surface along said inclined support reach.

7. The conveyor system as set forth in claim 5, wherein said upstanding abutment structure consists of a parapet extending in use laterally of the associated roller chain from one end of said support surface laterally to the opposing end thereof.

8. An attachment for carrying foods and the like on an articulated roller chain conveyor including an upper support reach and a lower support reach and an inclined support reach interconnecting the upper and lower support reaches, the conveyor having a plurality of links joined together by connecting pins having the outer ends thereof protruding laterally beyond the links, said attachment comprising a base and a pair of legs depending therefrom, said base having a support surface extending in use laterally of the associated roller chain for supporting foods and the like thereon along the support reach of the roller chain conveyor, the forward and trailing edges of said base being beveled along the length thereof, the beveled trailing edge of said base including two beveled surfaces respectively extending from said support surface and the opposite surface of said base and intersecting approximately midway therebetween, the beveled edges of said base cooperating with the conveyor and with the beveled edges of like adjacent attachments to facilitate movement thereof between the lower and inclined support reaches of the conveyor, support members of limited area extending from said support surface for supporting foods and the like spaced from said support surface, the spaces between the underside of the supported object and said support surface accommodating the passage of cooling fluid therethrough to cool the supported objects during transportation thereof along the support reach of the roller chain conveyor, said legs being disposed substantially normal to said base and depending therefrom and having facing surfaces disposed essentially parallel and spaced-apart a distance slightly less than the length of the associated connecting pins, each of said legs having a socket therein adjacent to the lower end thereof and positioned a predetermined distance from said support surface, said sockets respectively receiving the outer ends of said pins therein for mounting said attachment on the associated roller chain, whereby the beveled edges of the base accommodate free movement of said attachment between the lower and inclined support reaches of the conveyor.

9. The attachment as set forth in claim 8, wherein said support members comprise a plurality of ridges extending from the forward edge of said upper surface to the trailing edge thereof, whereby articles such as food and the like placed thereon are supported by the ridges at an elevated position with respect to said upper surface.

10. An attachment for carrying foods and the like on an articulated roller chain conveyor including an upper support reach and a lower support reach and an inclined support reach interconnecting the upper and lower support reaches, the conveyor having a plurality of links joined together by connecting pins having the outer ends thereof protruding laterally beyond the links, said attachment comprising a base and a pair of legs depending therefrom, said base having a support surface extending in use laterally of the associated roller chain for supporting foods and the like thereon along the support reach of the roller chain conveyor, the forward and trailing edges of said base being beveled along the length thereof, the beveled trailing edge of said base including two beveled surfaces respectively extending from said support surface and the opposite surface of said base and intersecting approximately midway therebetween, the beveled edges of said base cooperating with the conveyor and with the beveled edges of like adjacent attachments to facilitate movement thereof between the lower and inclined support reaches of the conveyor, two side guides respectively mounted on said base adjacent to the lateral ends thereof and extending upwardly therefrom with respect to said support surface for retaining foods and the like thereon, said side guides being dimensioned to prevent engagement thereof with the side guides of like adjacent attachments during movement thereof between the lower and inclined support reaches of the conveyor, said legs being disposed substantially normal to said base and depending therefrom and having facing surfaces disposed essentially parallel and spaced-apart a distance slightly less than the length of the associated connecting pins, each of said legs having a socket therein adjacent to the lower end thereof and positioned a predetermined distance from said support surface, said sockets respectively receiving the outer ends of said pins therein for mounting said attachment on the associated roller chain, whereby the beveled edges and the side guides of the base accommodate free movement of said attachment between the lower and inclined support reaches of the conveyor.

11. The attachment as set forth in claim 10, wherein each of said side guides consists of a wall member extending upwardly from the opposing lateral ends of said base and extending between the forward and trailing edges thereof and being substantially normal with respect thereto.

12. An attachment for carrying foods and the like on the support reaches of and for supporting upon an associated guide rail along the return reach of an articulated roller chain conveyor including an upper support reach and a lower support reach and an inclined support reach interconnecting the upper and lower support reaches, the conveyor having a plurality of links joined together by connecting pins having the outer ends thereof protruding laterally beyond the links, said attachment comprising a base and a pair of legs depending therefrom and a pair of support flanges extending respectively outwardly from said legs and away from each other, said base having a support surface extending in use laterally of the associated roller chain for supporting foods and the like thereon along the support reach of the roller chain conveyor, the forward and trailing edges of said base being beveled along the length thereof, the beveled trailing edge of said base including two beveled surfaces respectively extending from said support surface and the opposite surface of said base and intersecting approximately midway therebetween, the beveled edges of said base cooperating with the conveyor and with the beveled edges of like adjacent attachments to facilitate movement thereof between the lower and inclined support reaches of the conveyor, said legs being disposed substantially normal to said base and depending therefrom and having facing surfaces disposed essentially parallel and spaced-apart a distance slightly less than the length of the associated connecting pins, each of said legs having a socket therein adjacent to the lower end thereof and positioned a predetermined distance from said support surface, said sockets respectively receiving the outer ends of said pins therein for mounting said attachment on the associated roller chain, each of said support flange extending laterally outwardly from the associated leg adjacent to the lower end thereof for engagement with the associated guide rail along the return reach of the roller chain conveyor, whereby said support surface is maintained out of contact with any adjacent structure along the return reach of the conveyor so as to maintain said support surface free of contamination.

13. The attachment as set forth in claim 12, wherein the facing surfaces of said legs are essentially planar and each of said facing surfaces is continuous with the adjacent surfaces of the associated support flanges disposed away from said body, the juncture of said surfaces being arcuate along the length thereof thereby presenting a smooth guide for facilitating the engagement of the associated pin within said socket when mounting said attachment on said roller chain conveyor.

14. An attachment for carrying foods and the like on the support reach of and for supporting upon an associated guide rail along the return reach of an articulated roller chain conveyor which includes links with connecting pins having the outer ends thereof protruding laterally beyond the links, said attachment comprising an integral one-piece body of synthetic organic plastic resin including a base and a pair of legs depending therefrom and a pair of support flanges respectively extending outwardly therefrom and away from each other, said base having a support surface extending in use laterally of the associated roller chain for supporting foods and the like thereon along the support reach of the roller chain conveyor, the forward and trailing edges of said base being beveled along the length thereof, the beveled trailing edge of said base including two beveled surfaces respectively extending from said support surface and the opposite surface of said base and intersecting approximately midway therebetween, said legs being disposed substantially normal to said base and depending therefrom and as-molded having facing surfaces disposed essentially parallel and spaced-apart a distance slightly less than the length of the associated connecting pins, each of said legs having a socket therein adjacent to the lower end thereof and positioned a predetermined distance from said support surface, said sockets receiving the outer ends of said pins therein for mounting said attachment on the associated roller chain, each of said support flanges extending laterally outwardly from the associated leg adjacent to the lower end thereof for engagement with the associated guide rail along the return reach of the roller chain conveyor, whereby to maintain said support surface out of contact with any adjacent structures and objects except the food articles to be supported thereon along both the support reach and the return reach of the roller chain conveyor.

15. An attachment for carrying foods and the like on the support reaches of and for supporting upon an associated guide rail along the return reach of an articulated roller chain conveyor including an upper support reach and a lower support reach and an inclined support reach interconnecting the upper and lower support reaches, the conveyor having a plurality of links joined together by connecting pins having the outer ends thereof protruding laterally beyond the links, said attachment comprising a base and a pair of legs depending therefrom and a pair of support flanges extending respectively outwardly from said legs and away from each other, said base having a support surface extending in use laterally of the associated roller chain for supporting foods and the like thereon along the support reach of the roller chain conveyor, the forward and trailing edges of said base being beveled along the length thereof, the beveled trailing edge of said base including two beveled surfaces respectively extending from said support surface and the opposite surface of said base and intersecting approximately midway therebetween, the beveled edges of said base cooperating with the conveyor and with the beveled edges of like adjacent attachments to facilitate movement thereof between the lower and inclined support reaches of the conveyor, support members of limited area extending from said support surface for supporting foods and the like spaced from said support surface, the spaces between the underside of the supported object and said support surface accommodating the passage of cooling fluid therethrough to cool the supported objects during transportation thereof along the support reach of the roller chain conveyor, two side guides respectively mounted on said base adjacent to the lateral ends thereof and extending upwardly therefrom with respect to said support surface for retaining foods and the like thereon, said side guides being dimensioned to prevent engagement thereof with the side guides of like adjacent attachments during movement thereof between the lower and inclined support reaches of the conveyor, said legs being disposed substantially normal to said base and depending therefrom and having facing surfaces disposed essentially parallel and spaced-apart a distance slightly less than the length of the associated connecting pins, each of said legs having a socket therein adjacent to the lower end thereof and positioned a predetermined distance from said support surface, said sockets respectively receiving the outer ends of said pins therein for mounting said attachment on the associated roller chain, each of said support flanges extending laterally outwardly from the associated leg adjacent to the lower end thereof for engagement with the associated guide rail along the return reach of the roller chain conveyor, whereby said support surface is maintained out of contact with any adjacent structure along the return reach of the conveyor so as to maintain said support surface free of contamination.

* * * * *